(12) United States Patent
Kimijima et al.

(10) Patent No.: US 9,156,493 B1
(45) Date of Patent: Oct. 13, 2015

(54) STEERING APPARATUS

(71) Applicant: Showa Corporation, Gyoda-shi (JP)

(72) Inventors: Tsutomu Kimijima, Haga-gun (JP); Tatsuya Saito, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/604,035

(22) Filed: Jan. 23, 2015

(30) Foreign Application Priority Data

Mar. 27, 2014 (JP) .................................. 2014-066104

(51) Int. Cl.
*B62D 7/18* (2006.01)
*B62D 3/12* (2006.01)

(52) U.S. Cl.
CPC ........................................ *B62D 3/126* (2013.01)

(58) Field of Classification Search
USPC .............. 280/93.512, 93.513, 93.514, 93.515
See application file for complete search history.

(56) References Cited

U.S. PATENT DOCUMENTS

| | | | | |
|---|---|---|---|---|
| 6,408,976 B1 * | 6/2002 | Saito et al. | ..................... | 180/428 |
| 6,422,779 B1 * | 7/2002 | Spagnuolo | ..................... | 403/138 |
| 8,511,191 B2 * | 8/2013 | Kawakubo et al. | ............. | 74/409 |
| 8,925,939 B2 * | 1/2015 | Ohashi | ..................... | 280/93.514 |
| 2002/0024190 A1 * | 2/2002 | Tanaka | ..................... | 280/93.514 |
| 2006/0131828 A1 * | 6/2006 | Tanaka | ..................... | 280/93.514 |
| 2008/0224434 A1 * | 9/2008 | Ohara et al. | ............. | 280/93.514 |
| 2011/0248462 A1 * | 10/2011 | Schaedler et al. | ........ | 280/93.513 |
| 2012/0242054 A1 * | 9/2012 | Shiraishi et al. | ......... | 280/93.514 |
| 2012/0248724 A1 * | 10/2012 | Watanabe et al. | ........ | 280/93.514 |

FOREIGN PATENT DOCUMENTS

| | | |
|---|---|---|
| JP | H06-069061 U | 9/1994 |
| JP | 11-078914 A | 3/1999 |
| JP | 2004-291885 A | 10/2004 |
| JP | 2009-040076 A | 2/2009 |

OTHER PUBLICATIONS

U.K. Search Report mailed Jul. 14, 2015 for the corresponding U.K. Application No. GB1501286.7.

* cited by examiner

*Primary Examiner* — Toan To
(74) *Attorney, Agent, or Firm* — Leason Ellis LLP

(57) ABSTRACT

A steering apparatus includes a collision relaxation member provided on a surface of a housing, the surface being opposed to each rack end in a vehicle width direction. The collision relaxation member includes an elastic member arranged in an outer side of a rack shaft in a radial direction and absorbing a collision load from the corresponding rack end, and a shock absorbing member provided in an inner peripheral side of the elastic member and buckling by abutting of the rack end.

5 Claims, 4 Drawing Sheets

STEERING APPARATUS

CROSS-REFERENCE TO RELATED APPLICATIONS

This application is based on and claims priority under 35 USC 119 from Japanese Patent Application No. 2014-066104 filed on Mar. 27, 2014, the entire content of which is incorporated herein by reference.

BACKGROUND OF THE INVENTION

1. Technical Field

The present invention relates to a steering apparatus.

2. Related Art

In the steering apparatus, a rack shaft moves in a vehicle width direction by a steering operation of a driver and steered wheels are operated. In a steering apparatus including a motor for assisting the steering of the driver, a torque of the motor is transmitted to the rack shaft.

Incidentally, in the steering apparatus, rack ends are provided in both ends of the rack shaft. Then, the rack ends abut on a housing which houses the rack shaft, thereby controlling movement of the rack shaft.

A steering apparatus disclosed in JP-UM-A-6-69061 (Patent Document 1) is configured by providing an elastic member in a housing so that rack ends abut on the elastic member. Accordingly, a collision load is absorbed by the elastic member and the collision load inputted to the housing is reduced.

SUMMARY OF THE INVENTION

Furthermore, a steering apparatus in recent years includes the elastic member and controls output of the motor to reduce the speed at which rack ends abut on the housing (hereinafter referred to merely as "abutting speed") with the object of suppressing damage of other parts such as a rack gear. According to the output control of the motor, the collision load inputted to the housing is further reduced.

However, it is difficult to reduce the abutting speed of the rack ends, for example, in a power loss state or in the case of the failure of a control circuit which controls the motor output. Accordingly, it is required that the abutting speed of the rack ends can be reduced by methods other than the output control of the motor.

In view of above, an illustrative aspect of the present invention is to provide a steering apparatus capable of absorbing a collision load by an elastic member as well as reducing the abutting speed of rack ends.

An aspect of the present invention provides a steering apparatus including: a rack shaft moving in a vehicle width direction; a housing that houses the rack shaft; and rack ends provided at end portions of the rack shaft and abutting on the housing; a collision relaxation member provided on a surface of the housing, the surface being opposed to each rack end in the vehicle width direction, in which the collision relaxation member includes an elastic member arranged in an outer side of the rack shaft in a radial direction and absorbing a collision load from the corresponding rack end, and a shock absorbing member provided in an inner peripheral side of the elastic member and buckling by the abutting of the rack end.

With this configuration, when the rack end abuts on the elastic member, the collision load is absorbed due to the elastic member and the collision load inputted to the housing is reduced.

And, when the rack end abuts on the shock absorbing member, the shock absorbing member buckles and the collision load of the rack end is absorbed and the abutting speed of the rack end is reduced. As a result, it is possible to suppress damage of other parts as well as to reduce the collision load inputted to the housing.

The shock absorbing member may have a tubular shape.

With this configuration, for example, the collision load to be absorbed is larger than a case where the shock absorbing member is a bar-shaped member extending in the vehicle width direction, therefore, the abutting speed of the rack end is largely reduced. Accordingly, the danger that the other parts are damaged is further reduced as well as the collision load inputted to the housing is also further reduced.

The elastic member may extend more to the outer side in the vehicle width direction than the shock absorbing member.

With this configuration, the rack end abuts on the shock absorbing member only when the rack shaft is not stopped by the abutting of the rack end with respect to the elastic body.

Accordingly, the collision load is absorbed by the elastic member in the normal state (normal range) in which the collision load is small, and the collision load is damped by the elastic member and the shock absorbing member in the fail state (in an excessive-load state) in which the collision load is large.

Another aspect of the invention provides a steering apparatus including: a rack shaft moving in a vehicle width direction; a housing that houses the rack shaft; rack ends provided at end portions of the rack shaft and abutting on the housing; a collision relaxation member provided on a surface of each rack end, the surface being opposed to the housing in the vehicle width direction, in which the collision relaxation member includes an elastic member arranged in an outer side of the rack shaft in a radial direction and absorbing a collision load inputted to the housing, and a shock absorbing member provided in an outer peripheral side of the elastic member and buckling when abutting on the housing.

With this configuration, when the elastic member provided in the rack end abuts on the housing, the elastic member is deformed and the collision load inputted to the housing is reduced.

And, when the shock absorbing member provided in the rack end abuts on the housing, the shock absorbing member buckles and the collision load of the rack end is absorbed, then, abutting speed of the rack end is reduced. As a result, damage of other parts can be suppressed and the collision load inputted to the housing is reduced.

With any one of the configurations discussed above, it is possible to provide the steering apparatus capable of suppressing damage of other parts and reducing the collision load inputted to the housing by absorbing the collision load and reducing the abutting speed of the rack end by the elastic member.

DETAILED DESCRIPTION OF THE INVENTION

Description of Embodiments

A steering apparatus according to an embodiment of the present invention will be explained with reference to the drawings.

A steering apparatus 1 is an apparatus mounted on a vehicle and steering steered wheels of the vehicle.

Figure 1:
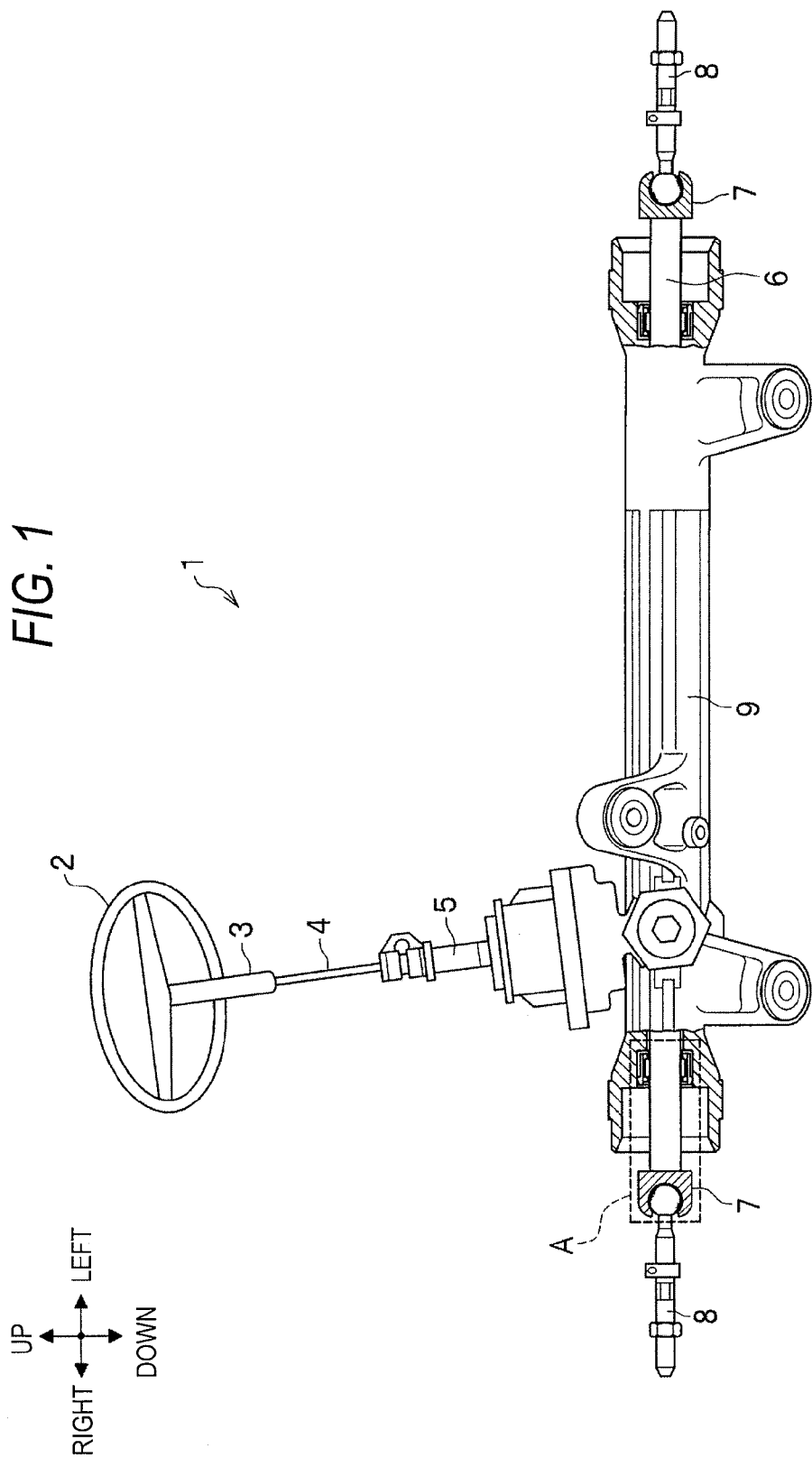
FIG. 1 is a front view of a steering apparatus showing the entire structure of the steering apparatus according to an embodiment.

As shown in FIG. 1, the steering apparatus 1 includes a steering wheel 2 operated by a driver, a steering shaft 3 integrally rotating with the steering wheel 2, a torsion bar 4 connected to a lower end of the steering shaft 3, a pinion shaft 5 connected to a lower end of the torsion bar 4 and having a pinion (not shown) at a lower end, a rack shaft 6 having a rack (not shown) engaged with the pinion, rack ends 7, 7 fixed to both ends of the rack shaft 6, rack end studs 8, 8 supported by the rack ends 7, 7 and a housing 9.

Then, steered wheels (not shown) are respectively connected to the rack end studs 8, 8. When the driver rotates the steering wheel 2, the rack shaft 6 moves to the left direction or the right direction, and the driver can steer the steered wheels.

Figure 2:
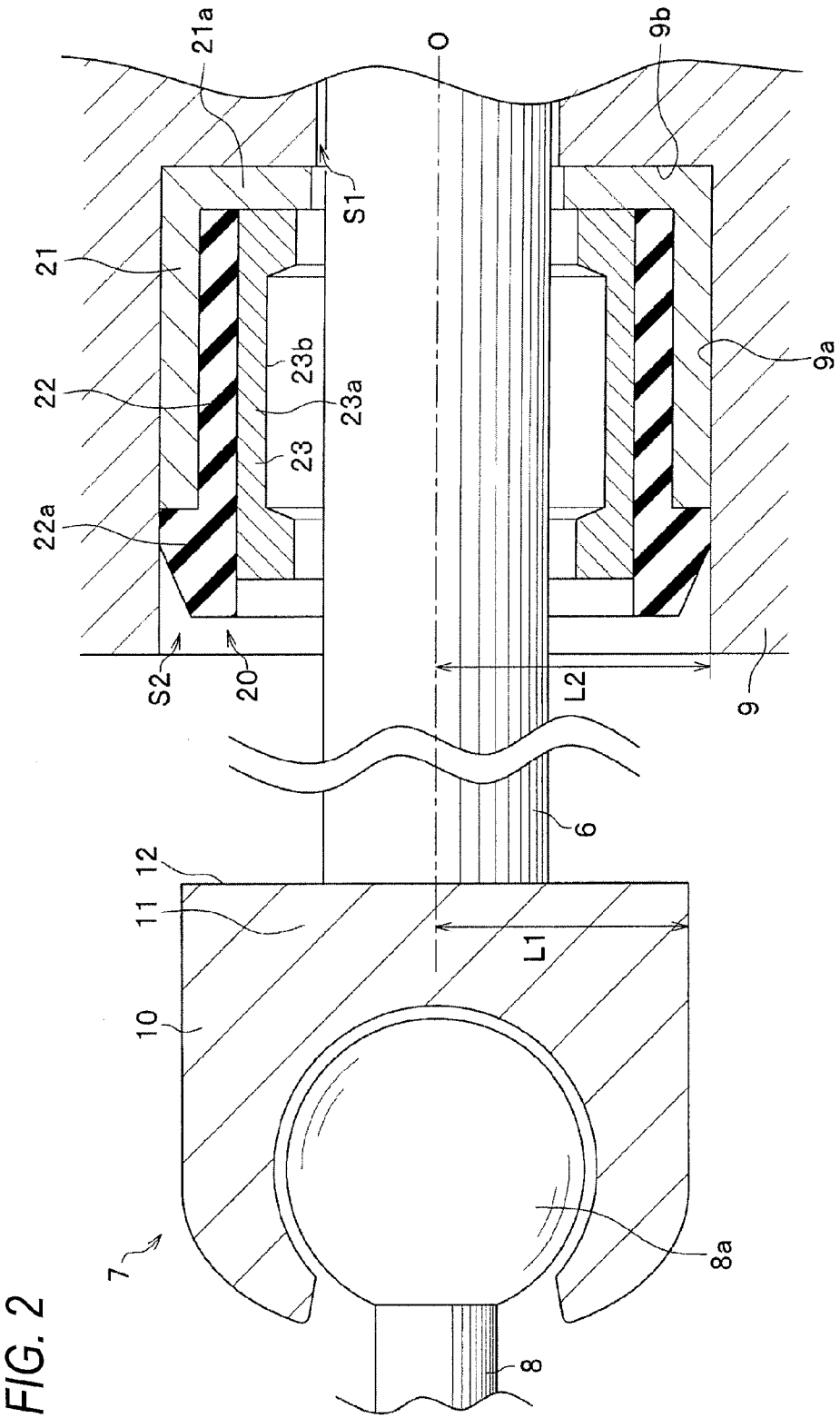
FIG. 2 is an enlarged view of a range surrounded by a dashed line "A" in FIG. 1.

As shown in FIG. 2, the rack end 7 includes a bottomed tubular-shaped rack end housing 10 having a bottom portion 11 in an inner side in the vehicle width direction and an attaching shaft (not shown) protruding from the bottom portion 11 to the inner side in the vehicle width direction to be attached to the rack shaft 6.

The attaching shafts are male screws in which threads are formed on outer peripheral surfaces, which are screwed to female screw holes (not shown) formed on both end surfaces of the rack shaft 6 so that the rack ends 7, 7 are fixed to both ends of the rack shaft 6.

The rack end housing 10 houses a ball 8a provided in the rack end stud 8 so as to be rotatable, and the rack end stud 8 can be folded freely with respect to the rack shaft 6.

The bottom portion 11 of the rack end housing 10 has a circular shape. An outside diameter R1 of the bottom portion 11 is larger than an outside diameter of the rack shaft 6, and the bottom portion 11 protrudes to an outer side of an outer peripheral surface of the rack shaft 6 in a radial direction. Accordingly, when the rack end 7 moves to an inner side in the vehicle width direction, the rack end 7 abuts on the housing 9 which houses the rack shaft 6 to thereby control movement of the rack shaft 6.

Hereinafter, a surface of the inner side of the bottom surface 11 in the vehicle width direction abutting on the housing 9 is referred to as an abutting surface 12.

The housing 9 is a tubular member in which a through hole S1 piercing in the right and left direction is formed, and the rack shaft 6 is inserted into the through hole S1.

Also in the through hole S1 of the housing 9, a bearing (not shown) supporting the rack shaft 6 is provided, and the rack shaft 6 is supported so as to move freely in the right and left direction so that a center axis O1 of the rack shaft 6 is not shifted to the outer side in the radial direction.

A cylindrical space S2 is formed at an edge of an opening end of the through hole S1 in the housing 9 by being cut out from the through hole S1 to the outside in the radial direction. A band-shaped wall surface opposed to the outer peripheral surface of the rack shaft 6 in wall surfaces of the housing 9 facing the cylindrical space S2 is referred to as an inner peripheral wall surface 9a, and a disk-shaped surface facing the outer side in the vehicle width direction and opposed to the abutting surface 12 of the rack end 7 is referred to as a restricting surface 9b.

The restricting surface 9b is an example of a "surface opposed to the rack end in the vehicle width direction.

An inside diameter L2 of the cylindrical space S2 is larger than an outside diameter L1 of the abutting surface 12 of the rack end 7. Accordingly, the rack end 7 enters the space S2 and the collision load of the rack end 7 is inputted to the restricting surface 9b.

Additionally, a collision relaxation member 20 is disposed in the outer side of the restricting surface 9b in the vehicle width direction for reducing the collision load inputted to the restricting surface 9b.

The collision relaxation member 20 has a cylindrical shape, and the rack shaft 6 is inserted into an internal space of the collision relaxation member 20.

The collision relaxation member 20 includes a cylindrical holding portion 21 extending along the inner peripheral wall surface 9a, a cylindrical elastic member 22 provided in an inner peripheral side of the holding portion 21 and a cylindrical shock absorbing member 23 provided in an inner peripheral side of the elastic member 22.

The holding portion 21 is a member for holding the elastic member 22 and the shock absorbing member 23, which is formed by a metal member or a resin member. The holding portion 21 is also fixed to the housing 9, and an end portion 21a in an inner side of the holding portion 21 in the vehicle width direction extends to the inner side in the radial direction to cover the restricting surface 9b.

The elastic member 22 is for absorbing the collision of the rack end 7.

The elastic member 22 is made of an elastomer such as urethane resin or natural rubber, which is restored to an original shape by a restoring force even when it is deformed by the abutting of the rack end 7.

The elastic member 22 is formed by an insert molding and so on, and is fixed to the housing 9 through the holding portion 21.

A tip portion 22a (an end portion of an outer side in the vehicle end direction) of the elastic member 22 extends more to the outer side in the vehicle width direction than the holding portion 21 as well as extends more to the outer side in the radial direction than the holding portion 21 to thereby cover the holding portion 21. Accordingly, the rack end 7 entering the space S2 does not contact the holding portion 21.

An end surface in an inner side of the elastic member 22 in the vehicle width direction contacts the end portion 21a of the holding portion 21, and an outer peripheral surface of the elastic member 22 contacts the holding portion 21 and the housing 9.

Accordingly, when the rack end 7 abuts on the elastic member 22, part of the volume of the elastic member 22 is pushed out to an inner peripheral surface side of the elastic member 22, and the elastic member 22 is deformed so that a length in the vehicle width direction is reduced.

An outer side of the outer peripheral surface of the elastic member 22 in the vehicle width direction is chamfered so as not to be scraped due to the contact with respect to a corner portion of the bottom portion 11 of the rack end 7.

The shock absorbing member 23 is formed by a metal member, which is provided for buckling when the rack end 7 abuts thereon.

An end surface in an outer side of the shock absorbing member 23 in the vehicle width direction is positioned in the inner side rather than the elastic member 23 in the vehicle width direction. Accordingly, when the rack shaft 6 is stopped by the abutting of the rack end 7 to the elastic member 22, the rack end 7 does not abut on the shock absorbing member 23.

The shock absorbing member 23 is fitted into the elastic member 22, in which a center portion 23a of the shock absorbing member 23 can be separated from the elastic member 22 arranged in the outer peripheral side.

The elastic member 22 contacts the outer peripheral side of the shock absorbing member 23 and an end surface in the inner side of the shock absorbing member 23 in the vehicle width direction abuts on the end portion 21a the holding portion 21.

In the center portion 23a of the shock absorbing member 23, a groove 23b which is concave from the inner peripheral surface to the outer side in the radial direction is formed, and the center portion 23a is made to be thinner than both end portions in the vehicle width direction. Accordingly, when the shock absorbing member is pushed in the inner side in the vehicle width direction, the center portion 23a of the shock absorbing member 23 easily buckles.

Next, a case where a movement amount of the rack shaft 6 is large and the rack end 7 abuts on the collision relaxation member 20 will be explained with reference to FIGS. 3A to 3C.

Figure 3A:
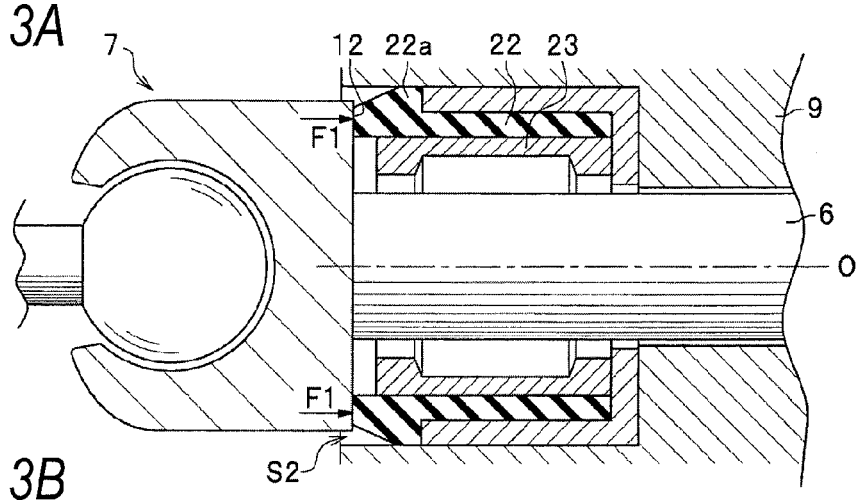
FIG. 3A is a view showing a state where a rack end abuts on an elastic member.

As shown in FIG. 3A, when the rack end 7 enters the space S2 of the housing 9, the abutting surface 12 of the rack end 7 abuts on the tip portion 22a of the elastic member 22 (see F1 of FIG. 3A).

Then, the elastic member 22 to which the collision load of the rack end 7 has been inputted is deformed to absorb the collision load, therefore, the reduced collision load is inputted to the restricting surface 9b.

As described above, in the normal state (normal range) in which the collision load is small, the rack shaft 6 is stopped when the rack end 7 abuts on the elastic member 22.

The shock absorbing member 23 is moved to the inner side in the radial direction due to deformation of the elastic member 22.

Figure 3B:
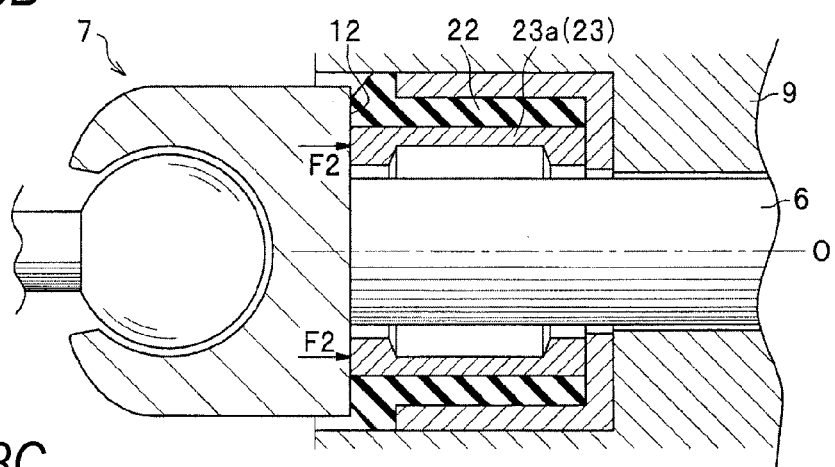
FIG. 3B is a view showing a state where the rack end abuts on a shock absorbing member and FIG. 3C is a view showing a state where the shock absorbing member buckles.

On the other hand, in a case where the rack end 7 abuts on the elastic member 22 but the rack shaft 6 is not stopped (in an excessive-load state), the rack end 7 further moves to the inner side in the vehicle width direction, and the abutting surface 12 of the rack end 7 abuts on the shock absorbing member 23 as shown in FIG. 3B (see F2 of FIG. 3B).

Figure 3C:
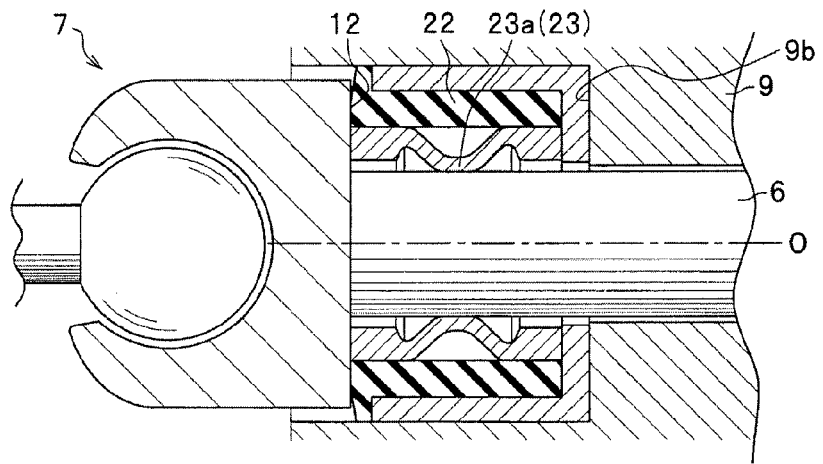

Then, as shown in FIG. 3C, the shock absorbing member 23 to which the collision load of the rack end 7 has been inputted buckles, and the center portion 23a of the shock absorbing member 23 protrudes toward the radial direction. As a result, the collision load of the rack end 7 is absorbed by the buckling of the shock absorbing member 23, and the abutting speed of the rack end 7 is reduced.

Though the center portion 23a of the shock absorbing member 23 buckles so as to protrude to the inner side in the radial direction in FIG. 3C, this is an example of buckling of the shock absorbing member 23, and a case where the center portion 23a of the shock absorbing member 23 protrudes toward the outer side in the radial direction as well as a case where the center portion 23a buckles in a bellows state (alternately protruding to the inner side and the outer side in the radial direction) can be also considered.

As described above, the collision load of the rack end 7 can be absorbed by the elastic member 22 in the steering apparatus 1 according to the embodiment.

The abutting speed of the rack end 7 is reduced by the shock absorbing member 23. Accordingly, it is possible to suppress damage of other parts such as the rack gear. Furthermore, the collision load to be inputted to the housing 9 can be also reduced as the collision load of the rack end 7 is reduced.

The steering apparatus 1 according to the embodiment has been explained as the above, the present invention is not limited to this. The steering apparatus 1 according to the embodiment is a rack-and-pinion type, however, a ball-nut type apparatus can be also applied.

The steering apparatus 1 according to the embodiment may include a motor-driven assist mechanism or a hydraulic assist mechanism assisting the steering of the driver.

Though the collision relaxation member 20 of the present embodiment includes the holding portion 21, it is also preferable that the holding portion is not included in the present invention.

Though the groove 23b is formed in the shock absorbing member 23 of the present embodiment, the shock absorbing member 23 in which the groove 23b is not formed can be applied in the present invention.

Furthermore, the shock absorbing member 23 is formed by a metal member which is not elastically deformed in the present embodiment, however, the present invention is not limited to this, and the shock absorbing member may be made of an elastomer.

Though the shock absorbing member 23 according to the embodiment has a tubular shape, the present invention is not limited to this. For example, a bar-shaped member extending in the vehicle width direction can be applied. When such plate-shaped shock absorbing member 23 is used, both ends in the vehicle width direction are fixed to the elastic member 22 by adhesion or pressure bonding.

According to the structure, the plate-shaped shock absorbing member 23 buckles to thereby reduce the abutting speed of the rack end 7. In the case of the bar-shaped shock absorbing member 23, plural members can be disposed around the rack shaft 6.

Figure 4:
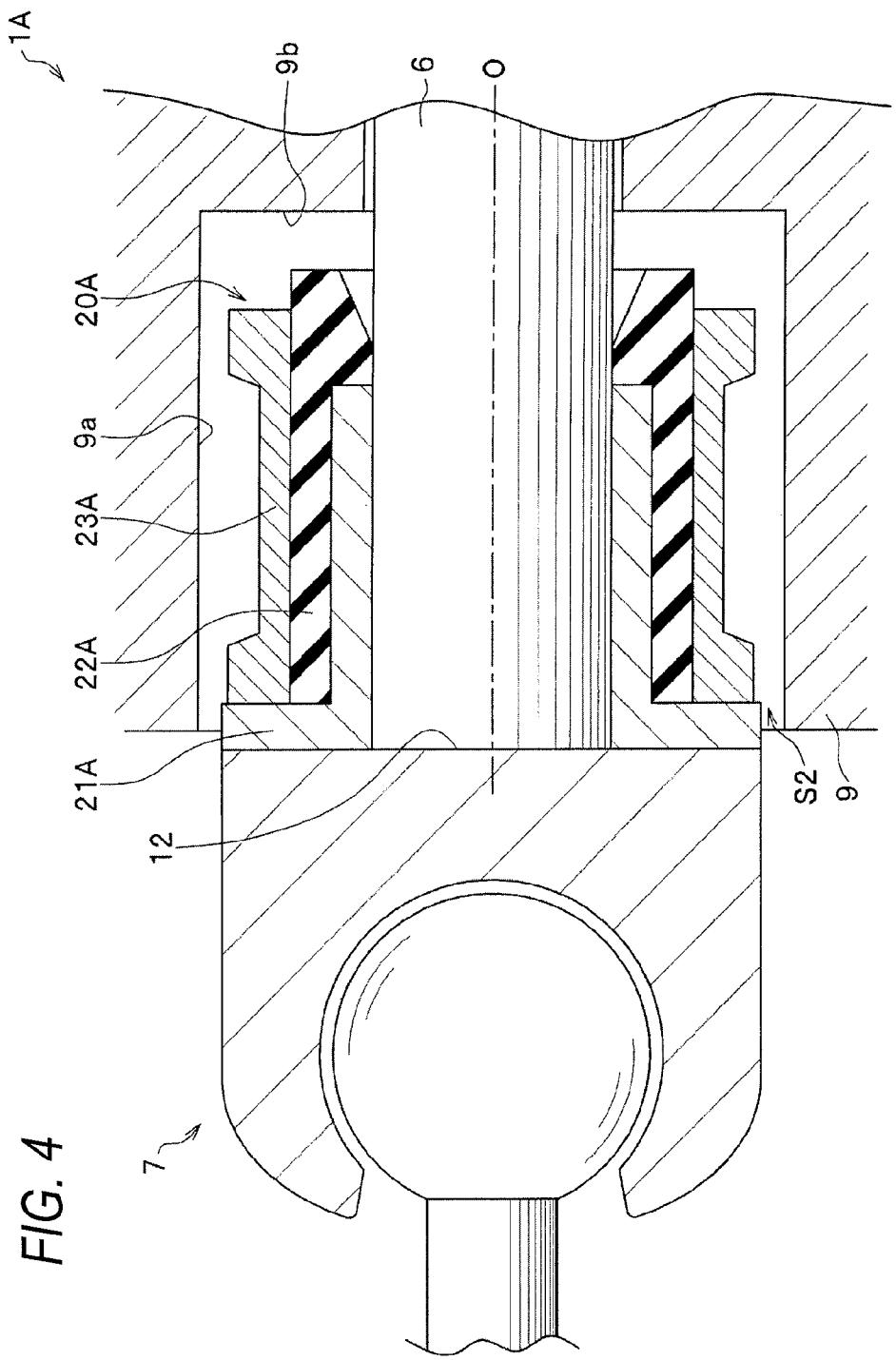
FIG. 4 is a view for explaining a structure of a steering apparatus according to a modification example.

Furthermore, the collision relaxation member (the elastic member 22 and the shock absorbing member 23) is provided in the housing 9 in the present embodiment, however, the present invention is not limited to this. For example, a collision relaxation member 20A may be provided in the abutting surface 12 of the rack end 7 as shown in FIG. 4.

Then, in the case where the collision relaxation member 20A is provided in the rack end 7, the collision relaxation member 20A includes a cylindrical holding portion 21A extending along the outer peripheral surface of the rack shaft 6, a cylindrical elastic member 22A provided in an outer peripheral side of the holding portion 21A and a cylindrical shock absorbing member 23A provided in an outer peripheral side of the elastic member 22A.

According to the structure, when the rack end 7 enters the space S2 of the housing 9 and the elastic member 22A abuts on the restricting surface 9b, the elastic member 22A is deformed and the collision load is absorbed.

Additionally, when the shock absorbing member 23A abuts on the restricting surface 9b, the shock absorbing member 23A buckles and the abutting speed of the rack end 7 is reduced.

As described above, also in a steering apparatus 1A according to the modification example, damage of other parts such as the rack gear can be suppressed and the reduced collision load is inputted to the housing 9.

What is claimed is:

1. A steering apparatus comprising:
a rack shaft moving in a vehicle width direction;
a housing that houses the rack shaft; and
rack ends provided at end portions of the rack shaft and abutting on the housing;
a collision relaxation member provided on a surface of the housing, the surface being opposed to each rack end in the vehicle width direction,
wherein the collision relaxation member includes
an elastic member arranged in an outer side of the rack shaft in a radial direction and absorbing a collision load from the corresponding rack end, and
a shock absorbing member provided in an inner peripheral side of the elastic member and buckling by the abutting of the rack end.

2. The steering apparatus according to claim 1, wherein the shock absorbing member has a tubular shape.

3. The steering apparatus according to claim 1, wherein the elastic member extends more to the outer side in the vehicle width direction than the shock absorbing member.

4. The steering apparatus according to claim 2, wherein the elastic member extends more to the outer side in the vehicle width direction than the shock absorbing member.

5. A steering apparatus comprising:
a rack shaft moving in a vehicle width direction;
a housing that houses the rack shaft;
rack ends provided at end portions of the rack shaft and abutting on the housing;
a collision relaxation member provided on a surface of each rack end, the surface being opposed to the housing in the vehicle width direction,
wherein the collision relaxation member includes
an elastic member arranged in an outer side of the rack shaft in a radial direction and absorbing a collision load inputted to the housing, and
a shock absorbing member provided in an outer peripheral side of the elastic member and buckling when abutting on the housing.

* * * * *